(12) United States Patent
Shinoda

(10) Patent No.: US 8,033,352 B2
(45) Date of Patent: Oct. 11, 2011

(54) BATTERY-FIXING DEVICE FOR A BATTERY FORKLIFT

(75) Inventor: Masanori Shinoda, Aichi-ken (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 6 days.

(21) Appl. No.: 12/634,917

(22) Filed: Dec. 10, 2009

(65) Prior Publication Data

US 2010/0155164 A1 Jun. 24, 2010

(30) Foreign Application Priority Data

Dec. 23, 2008 (JP) ................................ 2008-326702

(51) Int. Cl.
*B60R 16/04* (2006.01)
(52) U.S. Cl. ...................................... 180/68.5
(58) Field of Classification Search .................. 180/68.5
See application file for complete search history.

(56) References Cited

U.S. PATENT DOCUMENTS 4,739,118 A 4/1988 Elbe

FOREIGN PATENT DOCUMENTS

| JP | 58-211918 A | 12/1983 |
|---|---|---|
| JP | 61-001458 A | 1/1986 |
| JP | 61-1458 U | 1/1986 |
| JP | 62-081362 A | 4/1987 |
| JP | 62-81362 U | 5/1987 |
| JP | 62-139813 A | 6/1987 |
| JP | 62-139813 U | 9/1987 |
| JP | 01-141159 U | 9/1989 |
| JP | 04-75717 U | 7/1992 |
| JP | 05-094018 A | 4/1993 |
| JP | 5-94018 U | 12/1993 |
| JP | 2001-039692 A | 2/2001 |
| JP | 2001-055049 A | 2/2001 |

OTHER PUBLICATIONS

Extended European Search Report for corresponding European Patent Application No. EP 09 17 8532 dated Jun. 2, 2010, 9 pages, in English.

*Primary Examiner* — J. Allen Shriver, II
*Assistant Examiner* — Erez Gurari
(74) *Attorney, Agent, or Firm* — Sughrue Mion, PLLC

(57) ABSTRACT

A battery-fixing device includes a frame member, a stopper and a lock arm. The frame member is formed in a body of the forklift and provided by a battery space where a battery case is placed. The frame member has a through hole. The stopper has a lock portion and a groove. The stopper is movable in the through hole. The lock arm is pivotally supported on the frame member so as to engage with or disengage from the lock portion. The engagement of the lock arm with the lock portion keeps the stopper projecting from the through hole toward the battery space so that the groove is engagable with the battery case. The disengagement of the lock arm from the lock portion allows the stopper to be pulled back into the through hole so that the groove is not engaged with the battery case.

7 Claims, 4 Drawing Sheets

BATTERY-FIXING DEVICE FOR A BATTERY FORKLIFT

BACKGROUND OF THE INVENTION

The present invention relates to a battery-fixing device for a battery forklift.

In battery forklifts, a battery case is placed in a battery space that is formed in a body of the forklift. The battery case carries a battery. Japanese Unexamined Patent Application Publication No. 2001-55049 discloses a battery-fixing device for such battery forklifts.

The battery-fixing device has a frame member that extends vertically from the body to form a part of the battery space. The frame member has a through hole into which a pin is inserted. The pin is formed with a groove.

The pin is fitted into the through hole of the frame member so that the groove of the pin is engaged with the battery case, which prevents the battery case and the battery from being removed from the battery space. In replacement of the battery, the pin is pulled out of the through hole so that the groove is disengaged from the battery case, which allows the battery case to be removed from the battery space in the body.

In the above-described device, however, misalignment of the pin relative to the through hole of the frame member may occur. Such misalignment of the pin may cause the battery case to be removed from the battery space.

The present invention is directed to providing a battery-fixing device that reliably and simply prevents a battery case from being removed from a battery space.

SUMMARY OF THE INVENTION

In accordance with an aspect of the present invention, a battery-fixing device is used for a battery forklift that has a battery case in a battery space that is formed in a body of the forklift. The battery-fixing device includes a frame member, a stopper and a lock arm. The frame member is formed in the body and provided by the battery space. The frame member has a through hole. The stopper has a lock portion and a groove. The stopper is movable in the through hole. The lock arm is pivotally supported on the frame member so as to engage with or disengage from the lock portion. The engagement of the lock arm with the lock portion keeps the stopper projecting from the through hole toward the battery space so that the groove is engagable with the battery case. The disengagement of the lock arm from the lock portion allows the stopper to be pulled back into the through hole so that the groove is not engaged with the battery case.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

The following will describe the embodiment of the battery-fixing device according to the present invention with reference to the accompanying drawings.

Figure 1:
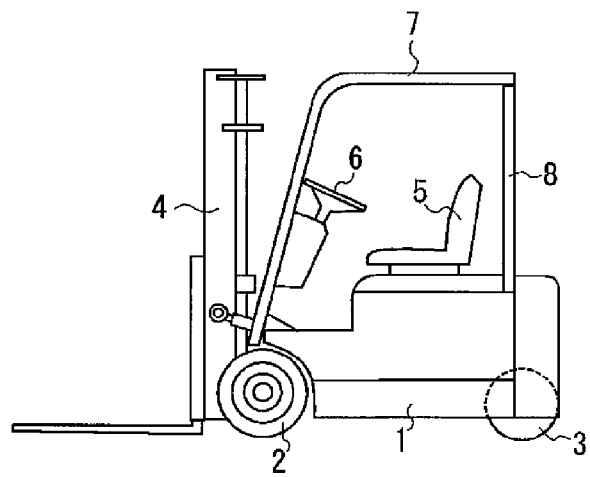
FIG. 1 is a side view of a three-wheel battery forklift equipped with a battery-fixing device according to an embodiment of the present invention.

It is noted that the left-hand side and the right-hand side as viewed in FIG. 1 are the front side and the rear side of the forklift, respectively, and that the upper and lower sides as viewed in FIG. 1 are the upper and lower sides of the forklift, respectively.

Figure 2:
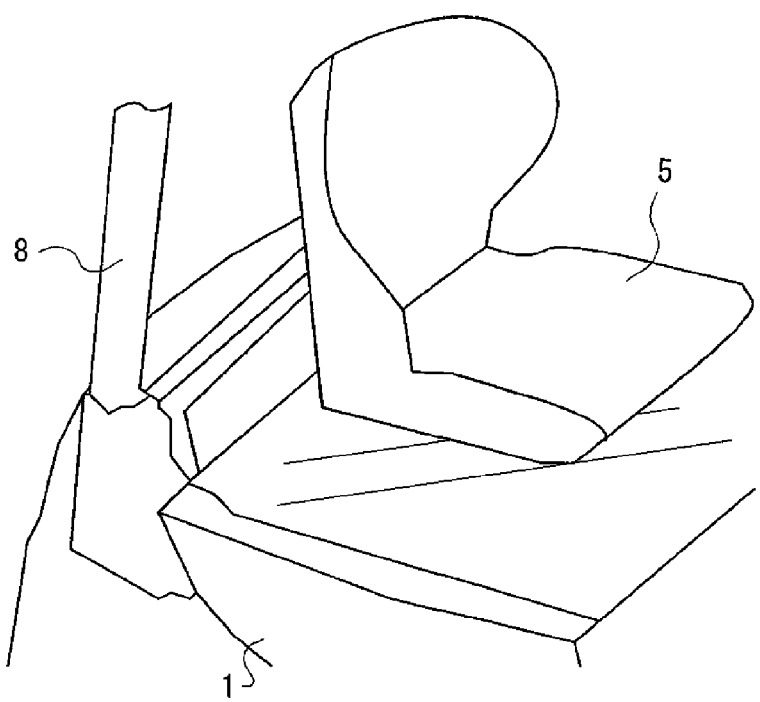
FIG. 2 is a fragmentary perspective view of the forklift of FIG. 1.

Referring to FIG. 1, the forklift has a body 1, a pair of drive wheels 2 (only one is shown) provided on opposite sides of the front portion of the body 1, and a steer wheel 3 with two tires provided in the middle of the rear portion of the body 1. The body 1 supports a mast assembly 4 on the front portion thereof and an operator seat 5 on the top portion thereof. The forklift further has a steering wheel 6 in front of the operator seat 5, front and rear pillars 7 and 8 extending around the operator seat 5, and a battery case 9 carrying a battery 9A under the operator seat 5 and normally covered by a hood not shown (see FIGS. 2 and 3).

Figure 3:
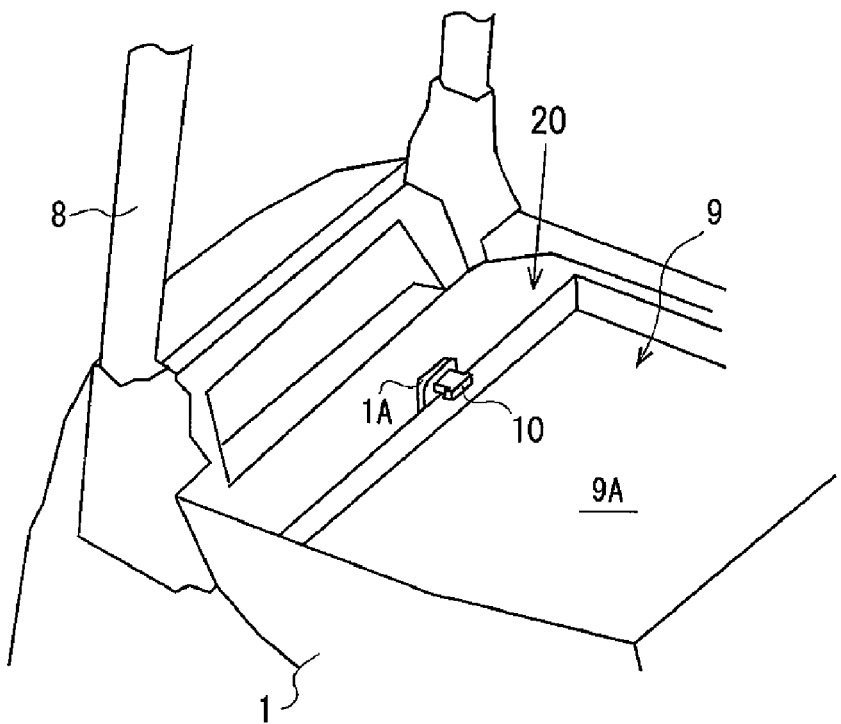
FIG. 3 is a fragmentary perspective view of the forklift of FIG. 1 with a hood removed.
Figure 4:
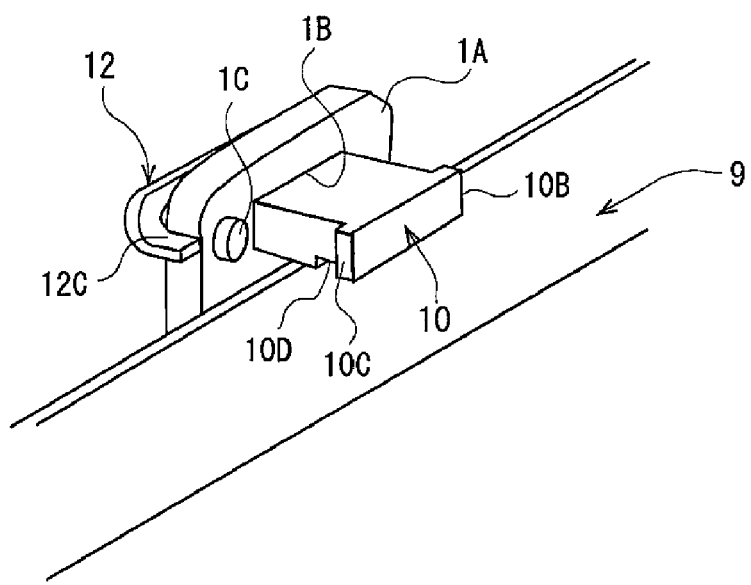
FIG. 4 is a perspective view of the battery-fixing device.
Figure 5:
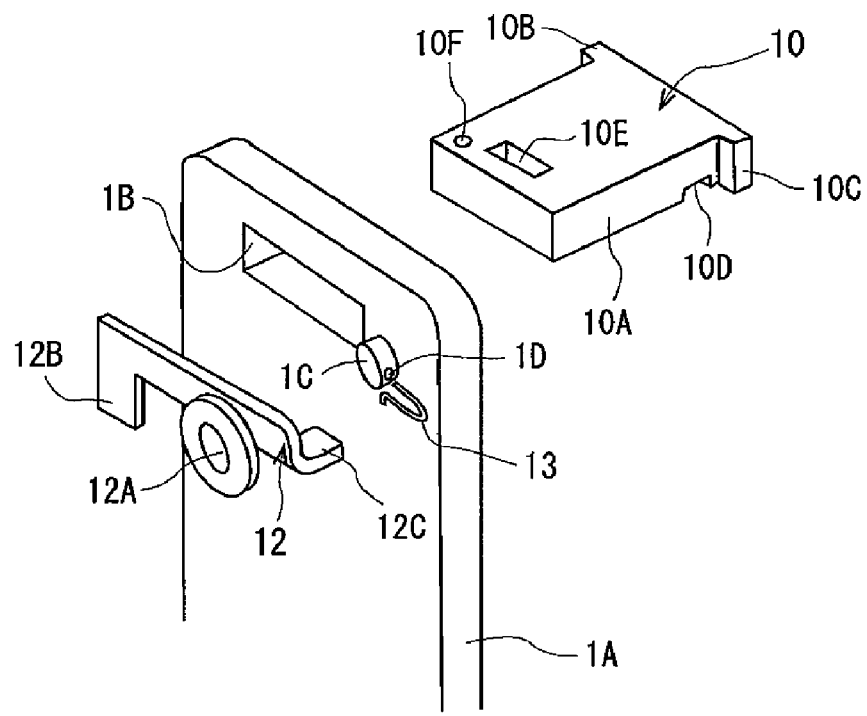
FIG. 5 is an exploded perspective view of the battery-fixing device of FIG. 4.

Referring to FIGS. 3 through 5, the body 1 has a frame member 1A that extends vertically behind the operator seat 5. The frame member 1A is formed with a rectangular through hole 1B into which a stopper 10 is inserted. The battery case 9 carrying the battery 9A is placed in a battery space 20 that is formed in the body 1. The frame member 1A forms a part of the battery space 20.

The stopper 10 is in the form of a generally rectangular plate and movable in the through hole 1B of the frame member 1A. The stopper 10 includes a rectangular base 10A and a pair of flanges 10B and 10C projecting laterally from the front ends of the respective side surfaces of the base 10A. The base 10A is slidingly movable in the through hole 1B, but the flanges 10B and 10C are prevented from entering the through hole 1B. The base 10A has a laterally extending groove 10D formed on the lower surface thereof. The groove 10D is located on the front side of the base 10A near the battery case 9. The base 10A has a rectangular lock hole 10E (a lock portion) and a bolt hole 10F formed therethrough. The lock hole 10E is located on the rear side of the base 10A away from the battery case 9. The bolt hole 10F is located near the lock hole 10E. The stopper 10 has a bolt 11 that is screwed into the bolt hole 10F of the base 10A from below (see FIGS. 6 and 7). The lock hole 10E may be replaced with a groove.

Referring to FIGS. 4 and 5, the frame member 1A has a fixed pin 1C that projects horizontally therefrom. The pin 1C supports a generally L-shaped lock arm 12 on the side of the frame member 1A opposite to the battery case 9 (battery space 20). The lock arm 12 is formed with a hole 12A that is associated with the pin 1C. With the pin 1C inserted in the hole 12A, a retaining pin 13 is inserted in a hole 1D of the pin 1C, so that the lock arm 12 is pivotally supported around the hole 12A relative to the frame member 1A. The lock arm 12 is rotatable on the frame member 1A in a perpendicular direction to the movement of the stopper 10 in the through hole 1B of the frame member 1A. The lock arm 12 is formed with an engaging portion 12B and a push portion 12C. The engaging portion 12B has a rectangular cross section and is located at one end of the lock arm 12 away from the pin 1C. The push portion 12C is located at the other end of the lock arm 12 near the pin 1C.

In the present embodiment, the battery-fixing device is composed of the above-described components such as the frame member 1A, the stopper 10, the lock arm 12 and the bolt 11.

Figure 6:
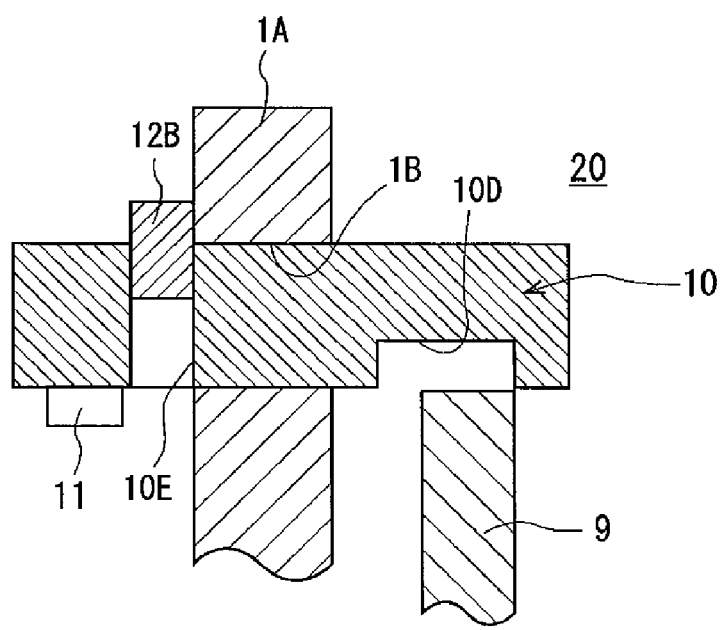
FIG. 6 is a sectional view of the battery-fixing device of FIG. 4 with a battery case locked.

In operation of the battery-fixing device, as shown in FIG. 6, firstly, the stopper 10 is moved to a position where the groove 10D can engage with the battery case 9, so as to project from the through hole 1B of the frame member 1A toward the battery case 9. Then the lock arm 12 is rotated so that the engaging portion 12B is fitted into the lock hole 10E of the stopper 10. By doing so, the stopper 10 is locked relative to the through hole 1B of the frame member 1A and prevented from dropping into the battery space 20. This reliably prevents the battery case 9 and the battery 9A from being removed from the battery space 20.

When the lock arm 12 is rotated in opposite direction by pushing the push portion 12C, the engaging portion 12B of the lock arm 12 is disengaged from the lock hole 10E of the stopper 10. In this condition, forward movement of the stopper 10 toward the battery case 9 is restricted because the bolt 11 screwed into the stopper 10 interferes with the frame member 1A, which prevents the stopper 10 from being removed from the through hole 1B of the frame member 1A.

Figure 7:
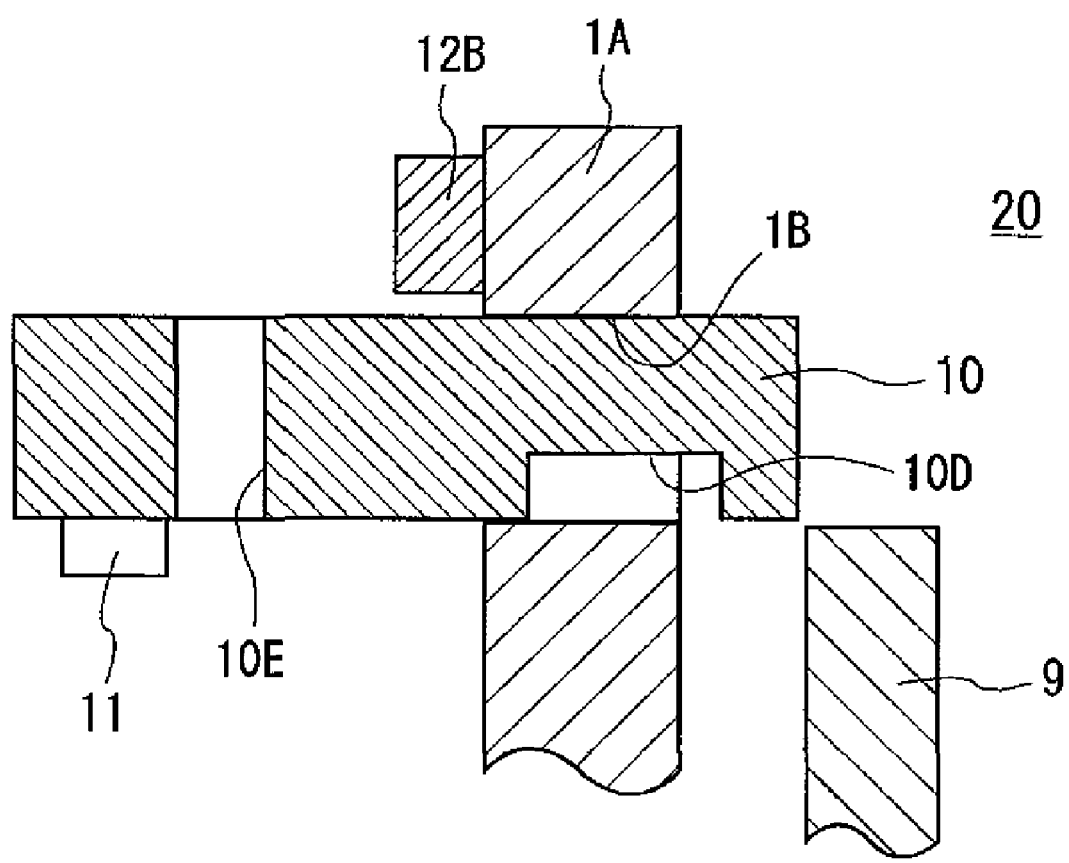
FIG. 7 is a sectional view of the battery-fixing device of FIG. 4 with the battery case unlocked.

In replacement of the battery 9A, as shown in FIG. 7, the lock arm 12 is rotated so that the engaging portion 12B is disengaged from the lock hole 10E of the stopper 10. Then the stopper 10 is pulled back into the through hole 1B from the battery space 20 so that the groove 10D is not engaged with the battery case 9, which allows the battery case 9 and battery 9A to be removed from the battery space 20 in the body 1.

When the engaging portion 12B of the lock arm 12 is disengaged from the lock hole 10E of the stopper 10, backward movement of the stopper 10 away from the battery case 9 is restricted because the flanges 10B and 10C of the stopper 10 interfere with the frame member 1A. As a result, the stopper 10 is prevented from being removed from the through hole 1B of the frame member 1A.

As described above, the engagement of the lock arm 12 with the lock hole 10E of the stopper 10 keeps the stopper 10 projecting from the through hole 1B of the frame member 1A toward the battery space 20 so that the groove 10D of the stopper 10 is engagable with the battery case 9. The disengagement of the lock arm 12 from the lock hole 10E allows the stopper 10 to be pulled back into the through hole 1B so that the groove 10D is not engaged with the battery case 9. Thus, the battery-fixing device according to the invention reliably and simply prevents the battery case 9 and the battery 9A from being removed from the battery space 20. Further, the stopper 10 has projections such as the flanges 10B and 10C and the bolt 11 that interfere with the frame member 1A to restrict the movement of the stopper 10 when the lock arm 12 is disengaged from the lock hole 10E of the stopper 10. Therefore, the stopper 10 is prevented from being removed from the through hole 1B of the frame member 1A, and the stopper 10 can be used successively after replacement of the battery 9A. That is, the same stopper 10 can be used to prevent another battery 9A provided subsequently from being removed from the battery space 20.

Further, the battery-fixing device, the major component of which is the frame member 1A located behind the operator seat 5, does not become an obstacle to a forklift operator.

What is claimed is:

1. A battery-fixing device for a battery forklift, the forklift having a battery case in a battery space that is formed in a body of the forklift, the battery-fixing device, comprising:
a frame member formed in the body and provided by the battery space, the frame member having a through hole;
a stopper having a lock portion and a groove, the stopper being slidingly movable in the through hole; and
a lock arm pivotally supported on the frame member so as to engage with or disengage from the lock portion,
wherein the engagement of the lock arm with the lock portion keeps the stopper projecting from the through hole toward the battery space so that the groove is engagable with the battery case, and the disengagement of the lock arm from the lock portion allows the stopper to be pulled back into the through hole so that the groove is not engaged with the battery case.

2. The battery-fixing device according to claim 1, wherein the frame member extends vertically to form the battery space.

3. The battery-fixing device according to claim 1, wherein the lock arm is rotatable on the frame member in a perpendicular direction to the stopper movement in the through hole.

4. The battery-fixing device according to claim 1, wherein the lock arm is supported on the side of the frame member opposite to the battery space.

5. The battery-fixing device according to claim 4, wherein the lock portion is provided by a rectangular hole that is formed through the stopper, and the lock arm has an engaging portion that is fitted into the rectangular hole to lock the stopper.

6. The battery-fixing device according to claim 1, wherein the stopper is prevented from being removed from the through hole.

7. The battery-fixing device according to claim 6, wherein the stopper has a projection that interferes with the frame member to restrict the movement of the stopper when the lock arm is disengaged from the lock portion.

* * * * *